United States Patent [19]

Pate

[11] Patent Number: 4,471,007

[45] Date of Patent: Sep. 11, 1984

[54] METHOD FOR IMPROVING THE ADHESION OF AMINE-CONTAINING ORGANOPOLYSILOXANE COMPOSITIONS

[75] Inventor: Michelle D. Pate, Adrian, Mich.

[73] Assignee: SWS Silicones Corporation, Adrian, Mich.

[21] Appl. No.: 481,435

[22] Filed: Apr. 1, 1983

[51] Int. Cl.³ .............................................. B05D 3/02
[52] U.S. Cl. .................................. 427/377; 156/329; 427/340; 427/387
[58] Field of Search ................ 156/329; 427/340, 377, 427/387

[56] References Cited

U.S. PATENT DOCUMENTS

| | | | |
|---|---|---|---|
| 3,306,800 | 2/1967 | Plueddemann | 156/329 |
| 4,170,700 | 10/1979 | Sweet | 528/12 |
| 4,233,428 | 11/1980 | Endo | 525/507 |
| 4,292,362 | 9/1981 | Marwitz et al. | 427/387 |

*Primary Examiner*—Thurman K. Page

[57] ABSTRACT

A method for improving the adhesion of an amine-containing organopolysiloxane composition to a substrate which comprises coating the substrate with an amine-containing organopolysiloxane composition and thereafter heating the coated substrate to an elevated temperature prior to or during exposure to moisture and carbon dioxide in excess of that present in the atmosphere.

13 Claims, No Drawings

METHOD FOR IMPROVING THE ADHESION OF AMINE-CONTAINING ORGANOPOLYSILOXANE COMPOSITIONS

The present invention relates to an amine-containing temperature vulcanizable organopolysiloxane composition (RTV) and more particularly, to a method for accelerating the cure rate of an amine-containing organopolysiloxane composition while improving the adhesion of the resultant elastomer to a substrate.

BACKGROUND OF THE INVENTION

Room temperature vulcanizable organopolysiloxanes are well known articles of commerce. In general room temperature vulcanizable organopolysiloxane compositions include the two-component systems, in which the compositions cure spontaneously after mixing the components and the one-component systems which cure in the presence of moisture, oxygen or some other material to form elastomers.

The one-component RTV organopolysiloxane compositions known heretofore are prepared by mixing diorganopolysiloxanes having terminal reactive groups, such as hydroxyl and alkoxy groups with amine-substituted organosilicon compounds in which the amine groups are bonded to silicon through Si—N linkages.

In certain industrial applications, these one-component amine-containing organopolysiloxanes have certain disadvantages. For example, the amine-containing organopolysiloxanes form a skin on the surface of the material on exposure to atmospheric moisture. The formation of the skin on the surface of an otherwise uncured room temperature vulcanizable composition impedes the cure of the material under the skin, thus making it difficult to further process the material as is frequently required and produces poor adhesion of the resultant silicone elastomer to a substrate.

Furthermore, amine-containing organopolysiloxane compositions which utilize amine-substituted silicon compounds containing aliphatic amines as cross-linking agents have a very limited "pot-life" once the composition has been exposed to atmospheric moisture. In many industrial applications it is essential that the composition have a long "pot-life, but once applied, a rapid cure with good adhesion are essential requirements.

U.S. Pat. No. 4,170,700 to Sweet describes a method for accelerating the surface curing of room temperature vulcanizable compositions by exposing a composition containing hydroxyl terminated organopolysiloxanes and amine-substituted silicon compounds to atmospheric moisture and carbon dioxide in excess of that present in the atmosphere.

U.S. Pat. No. 3,923,736 to Nitzsche et al describes room-temperature vulcanizable organopolysiloxane compositions having a long "pot-life" which contain diorganopolysiloxanes having terminal groups capable of condensing with an amine-substituted organosilicon compound containing at least three silicon bonded amine groups per molecule having the formula =NCH(CH$_3$(C$_2$H$_5$.

Generally, it has been found that when the amine-containing organopolysiloxanes are exposed to carbon dioxide and moisture to accelerate surface curing, the resultant elastomer does not exhibit good adhesion.

It is therefore, an object of the present invention to provide a method for improving the adhesion of an organopolysiloxane composition to a substrate. Another object of the present invention is to provide a method for improving the adhesion of an organopolysiloxane composition containing an amine-substituted silicon compound as a cross-linking agent. A further object of the present invention is to provide a method for preparing a silicone elastomer having a smooth, glossy surface.

SUMMARY OF THE INVENTION

The foregoing objects and others which will become apparent from the following description are accomplished in accordance with this invention, generally speaking, by providing a method for accelerating the curing of a room temperature vulcanizable organopolysiloxane composition while improving the adhesion of the resultant elastomer to a substrate which comprises heating in the presence of moisture a substrate coated with a composition containing an essentially linear diorganopolysiloxane and an amine-substituted silicon compound which is capable of cross-linking with the diorganopolysiloxane and having at least three Si-bonded —NR$_2$ groups per molecule prior to or while exposing the coated substrate to carbon dioxide in excess of that present in the atmosphere, in which R is a hydrogen atom or a hydrocarbon radical.

DESCRIPTION OF THE INVENTION

The diorganopolysiloxanes employed herein are not novel and can be any of the diorganopolysiloxanes having terminal reactive groups, preferably terminal hydroxyl groups that have been employed heretofore in room temperature vulcanizable (RTV) compositions. Generally, these diorganopolysiloxanes having terminal hydroxyl groups may be represented by the formula

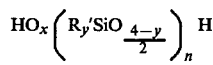

wherein each R' is a monovalent hydrocarbon radical or a substituted monovalent hydrocarbon radical, x has an average value of 0.99 to 1.01, y has an average value of 1.99 to 2.01, $x+y=3$, n is a number of at least 3 and preferably at least 50.

These siloxanes are known and have been fully described in, for example, U.S. Pat. Nos. 3,294,732; 3,127,363; 3,105,061 and others.

The siloxane polymers are essentially linear, hence they are predominately, i.e., at least 90 mole percent are R$_2$'SiO units. However, limited proportions, preferably below 5 mol percent and more preferably below 2 mol percent of R'SiO$_{3/2}$ units, R$_3$'SiO$_{\frac{1}{2}}$ units and/or SiO$_{4/2}$ units can be present.

In the above formula, each R' can be a monovalent hydrocarbon radical of up to 18 carbon atoms. Examples of radicals represented by R' include alkyl radicals such as the methyl, ethyl, n-propyl, isopropyl, dodecyl and octadecyl radicals; alkenyl radicals such as vinyl, allyl, hexenyl and octadecenyl radicals; cycloalkyl radicals such as the cyclobutyl, cyclopentyl, cyclohexyl and cyclodecyl radicals; cycloalkenyl radicals such as the cyclobutenyl, cyclopentenyl, cyclohexenyl and cyclodecenyl radicals; aryl radicals such as phenyl, xenyl, naphthyl and the phenanthryl radicals, aralkyl radicals such as the benzyl, B-phenylethyl and B-phenylpropyl radicals and alkaryl radicals and alkaryl radicals such as the tolyl, xylyl and ethylphenyl radicals.

Substituted hydrocarbon radicals represented by R' include halogenhydrocarbon radicals such as 0-, m- and p-chlorophenyl and bromophenyl radicals, a,a,a,-trifluorotolyl, 3,3,3-trifluoropropyl, chloro-, fluoro- and bromo-derivatives of the various hydrocarbon radicals set forth above as well as cyanoalkyl radicals such as B-cyanoethyl, cyanopropyl, cyano-n-butyl, cyano-n-propyl and omega-cyanoctadecyl radicals.

Preferably the radicals represented by R' have less than 8 carbon atoms and more preferably R' represents methyl phenyl, vinyl, ethyl, propyl and 3,3,3-trifluoropropyl radicals. Moreover, it is preferred that at least 50 mol percent of the R' radicals should be aliphatic hydrocarbon radicals of not more than 4 carbon atoms. Of course, as is usually the case, the R' radicals on a single silicon atom can be the same or different and various units in the siloxane chain can be the same or different homopolymers, e.g., dimethylsiloxane polymers, copolymers, e.g., dimethylsiloxane methylvinylsiloxane-, phenylmethylsiloxane polymers and mixtures thereof. The siloxane polymers employed can vary from relatively mobile fluids (viscosity 50 cs. at 25° C.) to gum-like materials having viscosities in the range of $10^6$ cs. at 25° C. This can be seen from the value of n in the general formula above, where n is at least 3 and is preferably at least 50 but can have a value as high as 2,000,000. The preferred siloxane polymers are those having viscosities in the range from 200 to 200,000 cs. at 25° C.

Other organopolysiloxanes which may be employed in this invention are the organopolysiloxane compositions which are prepared by reacting polymerizable organic monomers or mixtures of polymerizable organic monomers having aliphatic unsaturation with organopolysiloxanes in the presence of a free radical initiator. These compositions have been referred to as modified organopolysiloxanes and include the entire nonvolatile reaction product, including grafted organopolysiloxanes, organic homopolymers and copolymers, if any. The modified organopolysiloxanes are well known and their preparation has been described in U.S. Pat. Nos. 3,555,109; 3,776,875; 3,627,836; 3,631,087; 3,694,478 and others which are incorporated herein by reference.

The room temperature vulcanizable organopolysiloxane compositions are prepared by mixing under anhydrous conditions an organopolysiloxane and/or modified organopolysiloxane containing reactive groups with an amine-substituted silicon compound capable of cross-linking with the organopolysiloxane and having an average of at least three $—NR_2$ groups bonded to a silicon atom per molecule, where R is the same as above. It is preferred that only one R group be hydrogen.

Amine-substituted silicon compounds which may be employed as cross-linking agents are aminosilanes of the formula $$R^1{}_{4-z}Si(NR_2)_z$$

wherein R is the same as above and each $R^1$ is a monovalent hydrocarbon radical having up to 18 carbon atoms and z has an average value of at least 3 per molecule.

The aminosilanes which are employed as cross-linking agents contain on the average 3 or 4 amino substituents per silicon atom and 0 or 1 alkyl radical, aryl radical, alkaryl radical or aralkyl radical per silicon atom. Thus, tri- or tetra-functional silanes may be employed and since the tetra-functional silanes are more reactive, they will bring about a more rapid vulcanization than can be obtained with the trifunctional silanes. In general, these trifunctional aminosilanes may be represented by the formula $R^1Si(NR_2)_3$ and the tetra-functional silanes by the formula $Si(NR_2)_4$, where $R^1$ is an alkyl radical such as the methyl, ethyl, propyl or octadecyl radicals, an aryl radical such as the phenyl or anthracyl or a cycloalkyl radical such as a cyclohexyl radical or an aralkyl radical such as the benzyl or phenylethyl radical or an alkaryl radical such as the tolyl or xylyl radicals and each R is hydrogen or an alkyl, aryl, cycloalkyl, alkaryl or aralkyl radical as defined for $R^1$. Mixtures of these aminosilanes can also be employed.

Other amino-substituted silicon compounds which may be employed as cross-linking agents are aminosiloxanes having the general formula

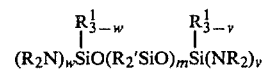
$$(R_2N)_wSiO(R_2'SiO)_mSi(NR_2)_v$$

and aminosilylalkanes having the general formula

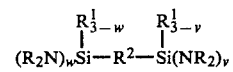
$$(R_2N)_wSi—R^2—Si(NR_2)_v$$

where R, R' and $R^1$ are the same as above, $R^2$ is a saturated or unsaturated divalent hydrocarbon radical having up to 10 carbon atoms, m is a number of from 0 to 50, v is a number of from 0 to 3, w is a number of from 0 to 3 and the sum of v+w is equal to at least 3.

Divalent saturated hydrocarbon radicals represented by $R^2$ above are methylene, ethylene, propylene, butylene, hexylene, octylene and decylene radicals. Divalent unsaturated hydrocarbon radicals represented by $R^2$ are ethyenylene, propenylene, butenylene, hexenylene, octenylene and decenylene radicals. An example of a divalent cyclic hydrocarbon radical is the phenylene radical.

The aminosilanes, and aminosiloxanes and aminosilylalkanes employed as cross-linking agents are described, for example, in U.S. Pat. Nos. 3,408,325 to Hittmair et al; 3,464,951 to Hittmair et al; 3,452,964 to Creamer; 3,644,434 to Hittmair et al and 3,816,164 to Pepe et al, which are incorporated herein by reference.

Other amine-substituted silicon compounds which may be employed as crosslinking agents are aminosilazanes of the formula $$(R_2N)_aR_b^1SiNH[R_b^1(R_2N)_cSiNH]_gSiR_b^1(NR_2)_a$$

wherein R and $R^1$ are the same as above and a is 2 or 3, b is 0 or 1, c is 1 or 2, g is at least 1.

The aminosilazanes are described, for example, in U.S. Pat. No. 3,032,528 to Nitzsche et al, which is also incorporated herein by reference.

Other amine-substituted silicon compounds which may be employed as cross-linking agents in the compositions of this invention may be represented by the formula $$R^1{}_{4-z}Si[NHCH(R^3)R^4]_z$$

where $R^1$ and z are the same as above, $R^3$ and $R^4$ which may be the same or different represent hydrocarbon radicals having from 1 to 18 carbon atoms, preferably from 1 to 10 carbon atoms, and more preferably from 1 to 4 carbon atoms. Preferably $R^3$ and $R^4$ are alkyl radicals, such as the methyl, ethyl, propyl, isopropyl, butyl, octyl, decyl and octadecyl radicals, aryl radicals such as the phenyl radical, alkaryl radicals such as the tolyl and ethylphenyl radicals and aralkyl radicals such as the benzyl and the B-phenylethyl radicals.

Examples of cross-linking agents represented by the above formula are silanes of the formula

and silazanes of the general formula

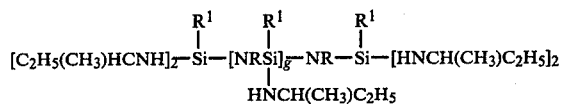

where R, $R^1$ and g are the same as above.

Other silicon compounds which can be used as cross-linking agents are aminosiloxanes of the formula

where R', $R^1$, $R^3$, $R^4$ and m are the same as above. In the above formulas $R^3$ is preferably a methyl radical and $R^4$ is an ethyl radical.

These cross-linking agents may be prepared, for example, by reacting halosilanes with a sec-butylamine. These secondary butylamine cross-linking agents and their method of preparation are described in detail in U.S. Pat. No. 3,923,736 to Nitzsche et al, which is incorporated herein by reference.

In the amine-substituted silicon compounds of this invention, the silicon valences that are not satisfied by the $=NCH(R^3)R^4$ groups are preferably satisfied by monovalent hydrocarbon radicals, halogenated monovalent hydrocarbon radicals, cyanoalkyl radicals, Si-bonded hydroxyl groups and/or siloxane oxygen atoms.

The amine-substituted silicon compounds are stored under essentially anhydrous conditions and are added to the siloxane polymer under essentially anhydrous conditions. These amine-substituted organosilicon compounds are employed in amounts which will provide at least one gram equivalent silicon atom of the amine substituted organosilicon compound per gram equivalent of reactive groups on the diorganopolysiloxane. Generally from 0.2 to 40 parts by weight of amine substituted organosilicon compound is added for each 100 parts by weight of the organopolysiloxane containing reactive groups.

The compositions of this invention may be prepared by mixing the various ingredients in any order desired; however, the mixture should be prepared in an atmosphere which is substantially free of water.

In addition to the siloxane polymer and amine-substituted organosilicon compound, the composition may contain additives such as compression-set additives, pigments, soluble dyes, aromatics (essential oils), oxidation inhibitors, heat stabilizers, flame retardants and light stabilizers, plasticizers and softeners such as trimethylsiloxy endblocked dimethylpolysiloxane fluids, reinforcing fillers and non-reinforcing fillers.

Examples of reinforcing fillers, i.e., fillers having a surface area of more than 50 m$^2$/g, are pyrogenically produced silicon dioxide, silica aerogels and precipitated silicon dioxide of large surface area.

Examples of non-reinforcing fillers, i.e., fillers having a surface area of less than 50 m$^2$/g are quartz, diatomaceous earth, calcium silicate, zirconium silicate, so-called "molecular sieves", metal oxide powders, such as titania, alumina, ferric oxide, zinc oxide and calcium carbonate. Fibrous fillers, for example, asbestos, glass fibers or organic fibers can also be used.

The fillers can advantageously be treated by known methods to include organosiloxy or alkoxy groups on their surface. Mixtures of different fillers can be used. The fillers are preferably employed in amounts of from 5 to 90 percent by weight, based on the total weight of the organopolysiloxane and filler.

Other additives which may be employed in the compositions of this invention are condensation catalysts such as those disclosed in, for example, U.S. Pat. No. 2,843,555; 2,127,363; and 3,082,527. Examples of suitable condensation catalysts are metallic salts and organometallic salts of carboxylic acids, such as lead octoate, dibutyltin dilaurate and dibutyltin salts of aliphatic carboxylic acids which are branched in the alpha-position to the carboxyl groups and have from 9 to 11 carbon atoms, amines, such as 3-ethoxypropylamine-1, and silanes which have at least one amine group bonded via carbon to silicon and at least one monovalent hydrocarbon radical, or a hydrocarbon radical substituted by an amine group and/or alkoxy group, and bonded via oxygen to silicon in each molecule. Silanes of the latter which not only act as condensation catalysts but as agents for improving the adhesion of the elastomers to the substrates are N-beta-(aminoethyl)-gamma-aminopropyltrimethoxysilane or a compound of the formula $$CH_3Si[O(CH_2)_2NH_2]_2(CH_2)_3O(CH_2)_2NH_2.$$

If condensation catalysts are used they are generally employed in amounts of from 0.01 to 5 percent by weight, preferably from 0.05 to 1 percent by weight, based on the total weight of the composition.

The compositions can be stored in any desired package so long as atmospheric moisture is excluded.

It has been found that improved adhesion is obtained when the composition is applied to a substrate and heated to an elevated temperature, i.e., from about 50° C. up to about 180° C., preferably from about 80° C. to about 150° C., and more preferably from about 100° C. to about 140° C. for a period of time ranging from a few minutes up to about 30 minutes.

The composition may be contacted with a gaseous medium containing moisture and carbon dioxide in excess of that present in the atmosphere during or after the heating cycle. Thus, curing of these compositions can be accelerated by exposing the compositions to a gaseous medium containing at least 0.1 percent by volume of carbon dioxide, preferably from 0.2 to about 50 percent by volume and more preferably from about 0.3 to about 10 percent by volume of carbon dioxide. Although a gaseous medium containing more than of 50 percent by volume of carbon dioxide can be used, no particular advantages have been observed. Moreover, when the compositions are subjected to pressure and an atmosphere of moisture and carbon dioxide in excess of that present in the atmosphere, accelerated deep section curing is achieved.

Also, it has been found that if the compositions are exposed to moisture and carbon dioxide and then heated to an elevated temperature, the elastomer may have a dull surface and that adhesion is not substantially improved. Preferably, the composition is contacted with moisture and carbon dioxide during or after the heating cycle in order to obtain the best results.

With the process of this invention, it is now possible to use an amine curing system having a long "pot-life" and still achieve rapid curing with improved adhesion to various substrates. Moreover, the process of this invention now makes it possible to substantially increase the production rate without sacrificing adhesion. Also, the compositions of this invention will cure and adhere firmly to substrates of the most diverse substances, such as glass, porcelain, earthenware, concrete, mortar, aluminum, wood, paper, polystyrene and synthetic resin lacquer coatings without the use of the customary primers, although it is of course possible to use the compositions on primed substrates.

The compositions of this invention are useful as adhesives, especially for adhering organopolysiloxane elastomers to various substrates for sealing joints and similar cavities in buildings, automobiles, water vehicles and aircraft. They are also useful as protective coatings, textile coatings, as paper coatings to provide a non-stick finish, and in the manufacture of electrical and thermal insulation, as well as for the preparation of laminates. The compositions are also useful in, for example, the silk screen process, where a composition having a long "pot-life" is desired and once applied to a substrate, rapid curing is achieved.

Various embodiments of this invention are further illustrated by the following examples in which all parts are by weight unless otherwise specified.

EXAMPLE 1

A mixture containing 100 parts of hydroxyl terminated dimethylpolysiloxanes having a viscosity of 4000 cs. at 25° C., 60 parts of ground quartz and 8 parts of methyltris-(sec-butylamino)silane is applied as a film 0.0127 centimeters in thickness to various substrates. One set of each of the coated substrates is exposed to a mixture of air and carbon dioxide in excess of that present in the atmosphere at 25° C. for four minutes. Another set of each of the coated substrates is exposed to a mixture of air and carbon dioxide in excess of that present in the atmosphere at 25° C. for four minutes and then heated to 110° C. for four minutes. The remainder of the coated substrates are heated at 110° C. in an oven for four minutes and then exposed to a mixture of air and carbon dioxide in excess of that present in the atmosphere at 25° C. for four minutes. After standing at room temperature for 24 hours in the presence of atmospheric moisture, the adhesion of the elastomers to the substrates is determined. The results are shown in the table.

EXAMPLE 2

A mixture containing 83 parts of hydroxyl terminated dimethylpolysiloxanes having a viscosity of 4000 cs. at 25° C., 17 parts of fumed silica filter and 10 parts of methyltris-(sec-butylamino)silane is applied to various substrates as a film 0.0127 centimeters in thickness and cured in accordance with the procedure described in Example (1). The adhesive properties of the elastomers are shown in the table.

EXAMPLE 3

A mixture containing 100 parts of hydroxyl terminated dimethylpolysiloxanes having a viscosity of 2000 cs. at 25° C., 60 parts of iron oxide and 10 parts of methyltris-(sec-butylamino)silane is applied as a film having a thickness of 0.0127 centimeters to various substrates and cured in accordance with the procedure described in Example (1). The adhesive properties of the elastomers are shown in the table.

EXAMPLE 4

A mixture containing 100 parts of hydroxyl terminated dimethylpolysiloxanes having a viscosity of 4000 cs. at 25° C., 60 parts of iron oxide and 8 parts of methyltris-(sec-butylamino)silane is applied as a film having a thickness of 0.0127 centimeters to various substrates and cured in accordance with the procedure described in Example (1). The adhesive properties of the elastomers are shown in the table.

EXAMPLE 5

A mixture containing 100 parts of hydroxyl terminated diemthylpolysiloxanes having a viscosity of 450 cs. at 25° C., 60 parts of iron oxide, and 20 parts of methyltris-(sec-butylamino)saline is applied to various substrates and cured in accordance with the procedure described in Example (1). The adhesive properties of the elastomers are shown in the table.

EXAMPLE 6

A mixture containing 100 parts of hydroxyl terminated dimethylpolysiloxanes having a viscosity of 4000 cs. at 25° C., 20 parts of trimethylsiloxy-terminated dimethylpolysiloxanes having a viscosity of 50 cs at 25° C., 12 parts of fumed silica, 10 parts of methyltris-(cyclohexylamino)silane, and 0.5 parts of N-beta-(aminoethyl)-gamma-aminopropyltrimethoxysilane is applied as a film having a thickness of 0.0127 centimeters to various substrates and cured in accordance with the procedure described in Example (1). The adhesive properties are shown in the table.

EXAMPLE 7

A mixture containing 100 parts of hydroxyl terminated dimethylpolysiloxanes having a viscosity of 4000 cs. at 25° C., 300 parts of zinc oxide, 8 parts of methyltris-(cyclohexylamino)silane and 0.5 parts of N-beta-(aminoethyl)-gamma-aminopropyltrimethoxysilane is applied as a film having a thickness of 0.0127 centimeters to various substrates and cured in accordance with the procedure described in Example (1). The adhesive properties are shown in the table.

EXAMPLE 8

(a) A modified organopolysiloxane is prepared by heating a mixture containing 92 parts of hydroxyl terminated dimethylpolysiloxanes having a viscosity of 450 cs. at 250° C., 94 parts of styrene, 77 parts of butyl arcylate and 7 parts of di-t-butyl peroxide to a temperature of 130° for about 4 hours in a nitrogen atmosphere with agitation. The unreacted monomers are then removed at 120° C. by applying a vacuum of about 1 mm Hg or less.

(b) A mixture containing 100 parts of the modified organopolysiloxane prepared in (a) above, 8 parts of methyltris-(sec-butylamino)silane and 0.5 parts of N-beta-(aminoethyl)-gamma-aminopropyltrimethoxysilane is prepared under anhydrous conditions and applied as a film having a thickness of 0.0127 centimeters to various substrates and cured in accordance with the procedure described in Example (1) above. The adhesive properties are shown in table.

TABLE

Adhesion Of Elastomer To Various Substrates

| Example No. | Substrate | Exposed To Carbon dioxide-air (4 min.) | Exposed to Carbon dioxide-air (4 min.); then heated 4 min. at 110° C. | Heated 4 min. at 110° C.; then exposed to carbon dioxide-air (4 min.) |
|---|---|---|---|---|
| 1 | Glass | Poor | Excellent | Excellent |
|   | Mylar | Poor | Excellent | Excellent |
|   | Concrete | Poor | Good | Good |
|   | Wood | Good | Excellent | Excellent |
|   | Asbestos* | | | |
| 2 | Aluminum | Poor | Good | Excellent |
|   | Mylar | Poor | Good | Excellent |
|   | Wood | Poor | Fair | Excellent |
|   | Concrete | Poor | Poor | Good |
|   | Asbestos* | Poor | Good | Excellent |
| 3 | Glass | Poor | Poor | Good |
|   | Aluminum | Poor | Poor | Excellent |
|   | Mylar | Poor | Good | Excellent |
|   | Wood | Poor | Good | Excellent |
| 4 | Glass | Poor | Poor | Good |
|   | Aluminum | Poor | Poor | Excellent |
|   | Mylar | Poor | Good | Excellent |
|   | Wood | Poor | Good | Excellent |
|   | Concrete | Poor | Poor | Good |
| 5 | Glass | Poor | Good | Excellent |
|   | Aluminum | Poor | Good | Excellent |
|   | Mylar | Good | Good | Excellent |
|   | Concrete | Good | Poor | Excellend7 |
|   | Asbestos* | Poor | Poor | Excellent |
| 6 | Asbestos* | Poor | Poor | Excellent |
|   | Aluminum | Poor | Good | Excellent |
|   | Mylar | Poor | Good | Excellent |
|   | Wood | Poor | Good | Excellent |
|   | Concrete | Poor | Poor | Good |
| 7 | Aluminum | Good | Excellent | Excellent |
|   | Asbestos* | Good | Excellent | Excellent |
|   | Mylar | Poor | Excellent | Excellent |
|   | Wood | Good | Good | Excellent |
|   | Glass | Good | Good | Excellent |
| 8 | Aluminum | Poor | Good | Good |
|   | Asbestos* | Poor | Good | Good |
|   | Wood | Good | Good | Excellent |
|   | Concrete | Poor | Good | Good |
|   | Glass | Poor | Good | Good |

Poor = Adhesive failure.
Good = Cohesive and adhesive failure.
Excellent = Cohesive failure.
*Rubber-asbestos composite.

What is claimed is:

1. A method for improving the adhesion of an amine-containing organopolysiloxane composition to a substrate which comprises heating a substrate coated with a composition containing an organopolysiloxane having reactive groups and an amine-substituted silicon compound capable of cross-linking with the organopolysiloxane and having an average of at least three Si-bonded —NR$_2$ groups per molecule, where R is selected from the group consisting of hydrogen and a monovalent hydrocarbon radical having up to 18 carbon atoms in the presence of moisture and at a temperature of from about 50° C. and thereafter exposing the coated substrate to carbon dioxide in excess of that present in the atmosphere.

2. The method of claim 1, wherein the coated substrate is simultaneously heated and exposed to moisture and carbon dioxide in excess of that present in the atmosphere.

3. The method of claim 1, wherein the amine-substituted silicon compound is an aminosilane of the formula $$R^1_{4-z}Si(NR_2)_z$$

where R is selected from the group consisting of hydrogen and a monovalent hydrocarbon radical having from 1 to 18 carbon atoms in which only one R can be hydrogen, $R^1$ is a monovalent hydrocarbon radical having from 1 to 18 carbon atoms, and z has an average of at least three.

4. The method of claim 1, wherein the amino-substituted silicon compound is an aminosiloxane of the formula $$(R_2N)_w\overset{R^1_{3-w}}{\underset{|}{Si}}O(R_2'SiO)_m\overset{R^1_{3-v}}{\underset{|}{Si}}(NR_2)_v$$

where R' is selected from the group consisting of a monovalent hydrocarbon radical and a substituted monovalent hydrocarbon radical, R is selected from the group consisting of hydrogen and a monovalent hydrocarbon radical having from 1 to 18 carbon atoms, $R^1$ is a monovalent hydrocarbon radical having from 1 to 18 carbon atoms, m is a number of from 0 to 50, v is a number of from 0 to 3, w is a number of from 0 to 3 and the sum of v+w is equal to at least 3.

5. The method of claim 1, wherein the substrate is heated to a temperature of at least 50° C.

6. The method of claim 2, wherein the substrate is heated to a temperature of at least 50° C.

7. The method of claim 1, wherein the substrate is heated to a temperature of from 80° to 150° C.

8. The method of claim 2, wherein the substrate is heated to a temperature of from 80° to 150° C.

9. The method of claim 1, wherein only one R is hydrogen.

10. The method of claim 4, wherein only one R is hydrogen.

11. A method for improving the adhesion of an amine-containing organopolysiloxane composition to a substrate which comprises mixing under anhydrous conditions an organopolysiloxane containing reactive groups with an amine-substituted silicon compound capable of cross-linking with the organopolysiloxane and having an average of at least three Si-bonded NR$_2$ groups per molecule, where R is selected from the group consisting of hydrogen and a monovalent hydrocarbon radical having from 1 to 18 carbon atoms, coating a substrate with the mixture, then heating the coated substrate in the presence of moisture and at a temperature of from about 50° C. and thereafter exposing the coated substrate to carbon dioxide in excess of that present in the atmosphere.

12. The method of claim 11, wherein the coated substrate is heated in the presence of moisture and carbon dioxide in excess of that present in the atmosphere.

13. The method of claim 11, wherein only one R is hydrogen.

* * * * *